United States Patent [19]

Smith

[11] Patent Number: 4,946,604

[45] Date of Patent: Aug. 7, 1990

[54] METHOD FOR TREATING A WELL BORE

[75] Inventor: William H. Smith, Walters, Okla.

[73] Assignee: Halliburton Company, Duncan, Okla.

[21] Appl. No.: 276,189

[22] Filed: Nov. 23, 1988

[51] Int. Cl.$^5$ ................... E21B 43/26; E21B 33/13; E21B 43/267

[52] U.S. Cl. ............... 252/8.551; 252/8.554; 252/315.3; 106/197.1

[58] Field of Search ............. 252/8.551, 8.554; 106/197.1, 208

[56] References Cited

U.S. PATENT DOCUMENTS

| | | | |
|---|---|---|---|
| 1,595,455 | 8/1926 | DeGroote | 252/340 |
| 1,654,155 | 12/1927 | Ackerman | 502/172 |
| 2,602,051 | 7/1952 | DeGroote | 252/331 |
| 2,652,394 | 9/1953 | DeGroote | 536/120 |
| 2,667,224 | 1/1954 | Howard | 166/283 |
| 2,681,704 | 6/1954 | Menaul | 166/22 X |
| 2,986,213 | 8/1957 | Fox | 166/42 X |
| 3,684,710 | 12/1969 | Cayle | 252/8.55 R |
| 3,888,312 | 6/1975 | Tiner et al. | 166/308 X |
| 3,931,147 | 1/1976 | Gray | 252/8.551 X |
| 4,110,230 | 8/1978 | Hessert et al. | 252/8.55 R X |
| 4,146,486 | 3/1979 | Hessert et al. | 252/8.55 C |
| 4,169,798 | 10/1979 | DeMartino | 252/8.55 R |
| 4,502,969 | 3/1985 | Shell | 252/8.551 |
| 4,553,601 | 11/1985 | Almond et al. | 166/308 X |
| 4,649,999 | 3/1987 | Sandy et al. | 166/295 X |

*Primary Examiner*—Matthew A. Thexton
*Assistant Examiner*—Chhaya Sayala
*Attorney, Agent, or Firm*—Robert A. Kent

[57] ABSTRACT

The present invention relates to a method for treating a well bore and the surrounding subterranean formation. A non-reducing sugar is admixed with a polysaccharide polymer and crosslinking agent in aqueous liquids to subsequently initiate viscosity reduction of the crosslinked polymer. The non-reducing sugar provides a means for obtaining time-controlled viscosity reduction at formation temperatures.

11 Claims, No Drawings

METHOD FOR TREATING A WELL BORE

BACKGROUND OF THE INVENTION

1. Field of the Invention

The present invention relates to the completion and stimulation of oil wells, gas wells, injection wells, water wells and similar boreholes.

2. Brief Description of the Prior Art

After drilling a borehole into a subterranean formation, tubing or casing is normally placed in the borehole to provide a conduit through which fluids may flow. The tubing or casing must be perforated so that fluids can be transported to or from the producing zones through the well bore.

Many times in completing wells, the flow of fluids into or out of the formation must be prevented. One instance is when a highly permeable zone of the formation is encountered and much of the fluid pumped into the well for drilling, completion, or stimulation purposes, leaks off into the formation through the highly permeable region. Another instance is when the well is shut-in, i.e., remains dormant for some period of time. In this situation, pressure in the well bore must be equalized with the formation pressure so that formation fluids will not enter the well bore. Heavy brines, defined as aqueous liquids nearly saturated with calcium chloride ($CaCl_2$), calcium bromide ($CaBr_2$), zinc bromide ($ZnBr_2$) or mixtures of these salts, are normally placed in the well bore to equalize formation pressure.

For the brine to equalize pressure, it must be contained within the well bore. Perforations in the tubing or casing (or the highly permeable zones of the formation as the case may be) must be sealed off or blocked. As a result, many compositions have been developed to perform this blocking function. Examples of these compositions, known in the art as temporary blocking gels, include crosslinked polysaccharides and crosslinked synthetic polymers. The term 'gel' is used hereafter to mean crosslinked polymer solutions.

Gels are also used in stimulating subterranean formations. Formations are stimulated by injecting fluids into the well bore at sufficient rates and pressures to produce fractures in the formation. When gels are used as fracturing fluids, they must retain viscosity and structure at formation temperatures to produce the desired fracture. Once the fracture is formed, the gel must "break", that is, the viscosity must be sufficiently reduced so that the fluid can be pumped or produced from the formation through the well bore.

For temporary blocking gels, viscosity and structure must remain in tack for extended time periods (from hours to weeks) depending on the particular well condition. The gels must also predictably degrade over time so that the well can be returned to production or to perform other treatments on the well. The blocking gels must break completely so that the perforations and nearby formation are free of gel residue when the broken gel is removed from the well.

Various chemicals have been used to break these highly viscoelastic gels, for example, persulfates, peroxides and acids. However, these compositions have had limited utility in that the gel breaks either uncontrollably (i.e., too quickly or not at all) or only at particular temperature ranges. Breaking gels in formations with low temperatures, used hereafter to mean formation temperatures less than 225° F., is particularly difficult using conventional breakers.

The present invention overcomes the deficiencies of conventional breakers by providing a new method of predictable, controlled breaking of polysaccharide solutions and gels used in well completion and stimulation operations.

SUMMARY OF THE INVENTION

The surprising discovery has been made that non-reducing sugars provide an effective means for reducing the viscosity of commonly used fluids for treating well bores and the surrounding formation. The fluids are prepared by admixing a polysaccharide polymer in an aqueous liquid, a non-reducing sugar of the present invention, and a crosslinking agent. The fluid is injected into a subterranean formation through a well bore penetrating the formation. The non-reducing sugar undergoes hydrolysis at formation temperatures or under acidic conditions to initiate time-controlled viscosity reduction of the crosslinked polymer so that the fluid can be pumped or produced from the formation through the well bore.

DETAILED DESCRIPTION

The present invention provides a means for breaking polysaccharide gels used in completing and stimulating well bores penetrating subterranean formations and the surrounding formation. The novel method comprises admixing a non-reducing sugar to a polysaccharide solubilized in aqueous liquids (normally containing salts) and a selected crosslinking agent. Non-reducing sugars provide an effective means for breaking the viscosity of polysaccharide gels.

Sugars incapable of reducing Cu(II) to Cu(I) (Fehling's solution) are described as non-reducing. Non-reducing sugars are acetals and ketals having the structural element

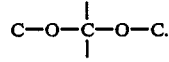

The acetal function has two alkoxy (—OR) groups and a hydrogen on the same carbon. The ketal function differs only in that the carbon does not have a hydrogen substituent. However, reducing sugars are hemiacetals and hemiketals having the structural element

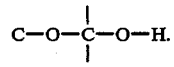

Hemiacetals are formed by the addition of alcohols to the carbonyl group of aldehydes. Hemiketals are formed by the addition of an alkoxy group rather than an alcohol.

In general, non-reducing sugars can be mono-, di-, or tri-saccharides. For monosaccharides to be non-reducing, the carbon at the one position must have a methyl substituent. For di- and tri-saccharides, the anomeric carbons must be involved in the glycosidic linkage between the monosaccharides. These structural elements inhibit the formation of a free carbonyl, thus rendering the ring sugars unable to open and close--unlike hemiacetals and hemiketals which freely open and close.

Preferred non-reducing sugars of the present invention include, but are not limited to, sucrose, raffinose, and trehalose. Sucrose ($\beta$-D-fructofuranosyl-$\alpha$-D-glucopyranoside) is a disaccharide joined by a glycosidic linkage between C-1 of the glucose and C-2 of the fructose. Sucrose is obtained from sugar cane and sugar beets. Another disaccharide is trehalose ($\alpha$-D-glucopyranosyl-$\alpha$-D-glucopyranoside). Trehalose consists of two glucose units and is fermented by yeast. Raffinose (O-$\alpha$-D-galactopyranosyl-(1$\rightarrow$6)-O-$\alpha$-D-glucopyranosyl-(1$\rightarrow$2)-$\beta$-D-fructofuranoside) is a trisaccharide comprising 1 mole each of D-galactose, D-glucose, and D-fructose. Raffinose is obtained from eucalyptus and cottonseed meal.

Non-reducing sugars are stable at low temperatures and neutral to basic pH's. However, under acidic conditions, the sugars undergo hydrolysis, and the glycosidic linkages break to liberate the constituent monosaccharides. The free monosaccharides are believed to function as reducing sugars that exhibit ring opening and closing. The sugar now has a free carbonyl group that further is believed to react to form organic acids. These organic acids are believed to attack other glycosidic linkages, including those of the completion or stimulation fluid. As polymer linkages break, the fluid becomes less viscous because the polymer is reduced to smaller and smaller molecular weight segments.

The most preferred non-reducing sugar of the present invention is sucrose. The sucrose molecule is known to be most stable at pH 9 and low temperatures. However, if sucrose is placed in an unstable environment, such as low pH and elevated temperatures, the glycosidic linkage is cleaved, producing free glucose and fructose. Free glucose and fructose then undergo hydrolysis to form a variety of organic acids and other products that, in turn, attack the glycosidic linkages of the polysaccharide polymer. These organic acids and other products include 5-(hydroxymethyl) furfural, lactic acid, levulinic acid, and formic acid.

The class of polysaccharide polymers of the present invention comprises galactomannans, galactomannan derivatives, derivatized cellulose ethers, among others. Examples of galactomannans and galactomannan derivatives include, but are not limited to, guar, hydroxypropyl guar, carboxymethyl guar, carboxymethyl hydroxypropyl guar, hydroxyethyl guar, locust bean gum, and tamarind. Examples of derivatized cellulose ethers include, but are not limited to, hydroxyethyl cellulose, carboxymethyl cellulose, carboxymethyl hydroxyethyl cellulose, and vicinal dihydroxy-substituted cellulose ethers.

These polysaccharides are readily soluble in aqueous liquids, used hereafter to mean any liquid containing some water, which may have a pH of from about 2.0 to about 11. If the polymer is to be crosslinked, the pH of the aqueous liquid must be compatible with the crosslinking agent. The aqueous liquids typically contain mono- or poly-valent salts, such as potassium chloride and calcium chloride. Derivatized cellulose ethers are the preferred polysaccharide polymers for heavy brines containing calcium bromide, zinc bromide, and mixtures thereof because the viscosity of the polymer in solution is less adversely affected by the salts and has low residue.

Once the polysaccharide polymer is solvated, the solution may be admixed with a variety of crosslinking agents that are well known in the art. Criteria for selecting a crosslinking agent include formation temperatures, pH and the desired gel strength. For moderate and high temperature formations, water soluble complexes of multi-valent metal cations may be selected, such as triethanolamine titanate and zirconium acetylacetonate. For polymer solutions having a pH less than about 4, acid-stable complexes of zirconium or aluminum may be selected.

Predictable time controlled delays in breaking polysaccharide gels used for completion and stimulation can be obtained using the method described in the present invention. Break times are controlled by varying the concentration of non-reducing sugar based on formation temperatures. For short break times (1 to 2 days) at low temperatures (140° F.), high concentrations of non-reducing sugar are needed. At temperatures in the range of 200° F., short break times are achieved with less than 0.5 wt % breaker.

The following examples are provided to illustrate the novel break characteristics of the present invention.

Example 1

To illustrate the controlled breaking of polysaccharide gels using non-reducing sugars of the present invention, the following experiments were performed. Heavy brines of various salts at different concentrations were prepared. A sample of 2.4 grams vicinal dihydroxy—substituted cellulose was solvated for 2 to 3 minutes in 7.2 ml of 70% 2-propanol:30% ethylene glycol. Two hundred milliliters of the selected brine was stirred on a Waring Blender at a rate to create about a ½" vortex into which the solvated polymer was added. The solution was stirred for about one hour. The appropriate amount of breaker was added and allowed to dissolve before adjusting the pH to 3.0 to 3.5 using 5% hydrochloric acid. A combination of crosslinkers was added to the stirring HEC/Brine and mixed for 30 seconds. The fluid was immediately transferred to an 8 ounce glass bottle containing a marble and placed in a water bath at a given test temperature. The time was recorded when the polymer solution was crosslinked. Gel samples were evaluated periodically by tipping the bottle back and forth. When the marble in the test sample moved fully through the bottle the gel was considered degraded and the time was recorded. The time from crosslinking to gel degradation is reported as the break time Table 1.

TABLE 1

| Test No. | Temp. Test (°F.) | lb Sucrose/Mgal[1] | Break Time |
|---|---|---|---|
| | | 11.6 ppg[2] CaCl$_2$ | |
| 1 | 215 | 10 | >48 Hours* |
| 2 | 215 | 20 | 24 Hours |
| 3 | 215 | 50 | 8–23 Hours |
| 4 | 215 | 100 | 6–21 Hours |
| 5 | 170 | 50 | 9–12 Days |
| 6 | 170 | 200 | 2–5 Days |
| 7 | 170 | 400 | 2–5 Days |
| 8 | 170 | 1000 | 1 Day |
| 9 | 150 | 200 | 16 Days |
| 10 | 150 | 400 | 9 Days |
| 11 | 150 | 600 | 7 Days |
| 12 | 140 | 400 | 13 Days |
| 13 | 140 | 1000 | 2–4 Days |
| | | 15.1 ppg CaBr$_2$ | |
| 14 | 170 | 200 | 3–5 Days |
| 15 | 170 | 400 | 2–5 Days |
| 16 | 150 | 400 | 3 Days |
| 17 | 140 | 200 | 13 Days |
| 18 | 140 | 400 | 12 Days |

TABLE 1-continued

| Test No. | Temp. Test (°F.) | lb Sucrose/Mgal[1] | Break Time |
|---|---|---|---|
| 19 | 140 | 1000 | 1-2 Days |
| 16.2 ppg Brine (19.2 ppg ZnBr$_2$ Diluted with Water) | | | |
| 20 | 170 | 50 | 4 Days |
| 21 | 170 | 100 | 3 Days |
| 22 | 170 | 200 | 2-5 Days |
| 23 | 170 | 400 | 2-5 Days |
| 24 | 140 | 800 | 3 Days |
| 25 | 140 | 1000 | 2-5 Days |
| 16.2 ppg Brine (19.2 ppg ZnBr$_2$ + 11.6 ppg CaCl$_2$) | | | |
| 26 | 170 | 100 | 21 Days |
| 27 | 170 | 200 | 7 Days |
| 28 | 170 | 400 | 4-7 Days |
| 29 | 140 | 800 | 5 Days |
| 19.2 ppg Brine (19.2 ppg ZnBr$_2$ + 11.6 ppg CaCl$_2$) | | | |
| 30 | 150 | 400 | 7 Days |
| 31 | 140 | 800 | 6 Days |
| 13 ppg Brine (19.2 ppg ZnBr$_2$ + 11.6 ppg CaCl$_2$) | | | |
| 32 | 150 | 400 | 7 Days |
| 33 | 140 | 800 | 7 Days |

[1]Pounds sucrose per 1000 gallons aqueous liquid
[2]Pounds per gallon aqueous liquid The rate of degradation of the HEC gel is controlled by (1) the amount of non-reducing sugar added to the fluid and (2) temperature. The gel can be broken in hours or days. To achieve a faster break time at a given temperature, the concentration of non-reducing sugar is simply increased. The data in Table I also show that the rate of breaking is affected by the type of heavy brine. CaCl$_2$ brine at 11.6 ppg and CaCl$_2$/ZnBr$_2$ brines at 13 and 16.2 ppg give comparable breaks. Whereas 15.1 ppg CaBr$_2$ brine and 16.2 ppg ZnBr$_2$ gave shorter break times. Generally, gels in ZnBr$_2$ brine break faster than in CaBr$_2$ brine, which break slightly faster than gels in CaCl$_2$ brine.

Example 2

To further illustrate the application of the present invention to a variety of polysaccharide gels, the following tests were performed. Hydroxypropyl guar (HPG) at 50 lbs/Mgal was added to 500 ml of 2% potassium chloride tap water in a Waring Blender. Fumaric acid and sodium bicarbonate were added to adjust the pH while stirring the solution at rate sufficient to create a vortex of about one inch. Two hundred milliliters of the polymer solution was transferred to another Waring Blender and the appropriate amount of non-reducing sugar was dissolved. A triethalonamine titanate crosslinking agent was prepared by diluting the titanate 1:1 with water and allowing the dilution to set for at least 30 minutes before adding it to the polymer. Crosslinking agent, at 0.2 milliliter, is added to the stirring polymer solution and mixed for 30 seconds. The fluid is then transferred to an 8 oz. bottle and placed in a water bath at the test temperature. The consistency of the gel was visually monitored and the break time recorded. Concentrations of 100 and 200 lbs/Mgal sucrose were added to the HPG gels. In tests at 170° F., the gel was broken within 14 days.

What is claimed:

1. A method for treating a well bore and the surrounding subterranean formation comprising:
   preparing a fluid by admixing an aqueous liquid, a solvatable polysaccharide selected from the group comprising galactomannans, galactomannan derivatives and derivitized cellulose ethers and a crosslinking agent for said polysaccharide;
   admixing a non-reducing sugar in an amount sufficient to induce viscosity reduction of the fluid under well bore conditions; and
   injecting the fluid into said well bore.

2. The method of claim 1 wherein said polysaccharide is selected from the group comprising guar, derivatized guar, and derivatized cellulose ethers.

3. The method of claim 1 wherein said non-reducing sugar is selected from the group comprising sucrose, raffinose, and trehalose.

4. The method of claim 1 wherein said crosslinking agent is selected from the group comprising complexes of multivalent metal cations.

5. The method of claim 1 wherein the pH of said aqueous liquid is in the range of about 2 to about 11.

6. A method for treating a well bore and the surrounding subterranean formation comprising:
   preparing a fluid by admixing an aqueous liquid and a solvatable polysaccharide selected from the group comprising guar, derivatized guar, and derivatized cellulose ethers and a crosslinking agent for said polysaccharide;
   admixing a non-reducing sugar selected from the group comprising sucrose, raffinose, and trehalose in amount sufficient to induce viscosity reduction of the fluid under well bore conditions; and
   injecting the fluid into said well bore.

7. The method of claim 6 wherein said crosslinking agent is selected from the group comprising complexes of multivalent metal cations.

8. The method of claim 6 wherein the pH of said aqueous liquid is in the range of about 2 to about 11.

9. A method for treating a well bore and the surrounding subterranean formation comprising:
   preparing a fluid by admixing an aqueous liquid and a solvatable polysaccharide selected from the group comprising guar, derivatized guar and derivatized cellulose ethers and a crosslinking agent for said polysaccharide;
   admixing sucrose in an amount sufficient to induce viscosity reduction of the fluid under well bore conditions; and
   injecting the fluid into said well bore.

10. The method of claim 9 wherein said crosslinking agent is selected from the group comprising complexes of multi-valent metal cations.

11. The method of claim 9 wherein said aqueous liquid is in the range of about 2 to about 11.

* * * * *